R. H. KIRK.
DEVICE FOR CUTTING PLATE ICE.
APPLICATION FILED AUG. 17, 1908.
936,544.
Patented Oct. 12, 1909.
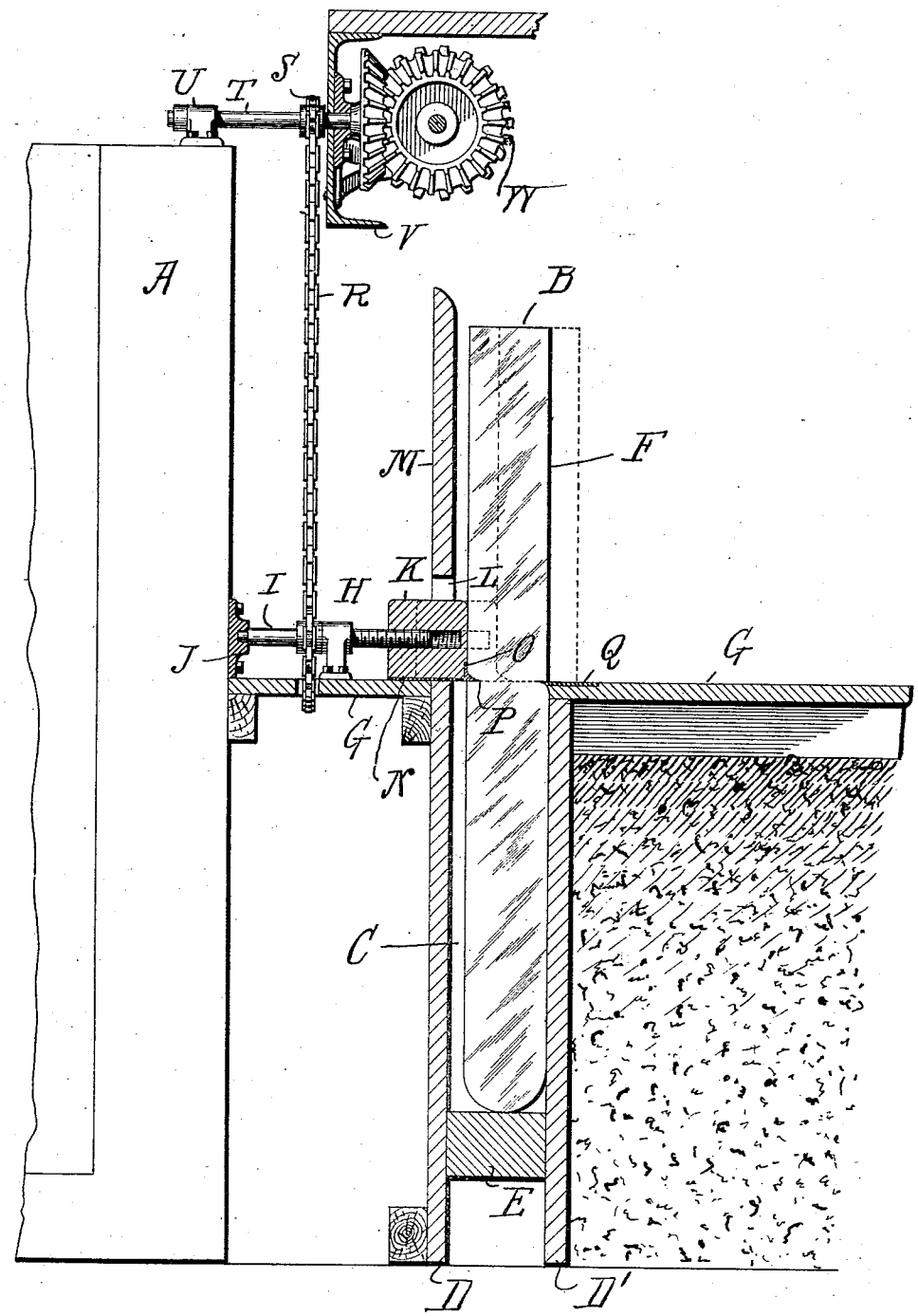
Witnesses:
C. H. Bertholf
May T. McLarry
Inventor
Robert H. Kirk
By his Attorney

UNITED STATES PATENT OFFICE.

ROBERT H. KIRK, OF BROOKLYN, NEW YORK.

DEVICE FOR CUTTING PLATE-ICE.

936,544.  Specification of Letters Patent.  Patented Oct. 12, 1909.

Application filed August 17, 1908. Serial No. 448,861.

*To all whom it may concern:*

Be it known that I, ROBERT H. KIRK, a citizen of the United States, residing at Brooklyn, in the county of Kings and State of New York, have invented a certain new and useful Improvement in Devices for Cutting Plate-Ice, of which the following is a specification.

The invention is a device for dividing cakes of plate ice into smaller blocks or fractions.

The invention consists in the combination of means for retaining the ice cake in vertical position, a fixed horizontal cutting blade supported on one side of said retaining means, a movable horizontal cutting blade supported on the opposite side, the said blades having their cutting edges disposed in the same horizontal plane, and means for moving said movable blade with reference to said fixed blade; also, in the various combinations more particularly pointed out in the claims.

The accompanying drawing is a vertical section of my cutting device, showing the ice cake subjected to its action.

The device is preferably located in close proximity to an end wall A, of the freezing tank, in which the cakes of plate ice are formed. The cake B is preferably hoisted from the tank, and then, by any suitable means, carried above a pit C, the side walls D, D' of which are separated by a distance a little exceeding the thickness of said cake. The cake is then lowered into this pit until its bottom edge rests on the support E, and is held in a vertical position by the side walls D D', the portion F of the cake to be cut off extending above the platform G.

On the bottom of the platform which extends between wall D of the pit and the wall A of the freezing tank, is a standard H, in which is journaled a shaft I. At one end, said shaft is received in a bearing J fast upon the tank wall A. Beyond the standard H, the shaft is threaded to enter the internally threaded block K, which rests on platform G and passes through an opening L in an upward extension M, of pit wall D. On the lower side of block K is a steel blade N having an upwardly projecting flange O received in the outer face of block K, and a horizontally cutting edge P protruding beyond said block. On the upper side of platform G and above the pit wall D' is a stationary cutting blade Q arranged in the same horizontal plane as blade N. Fast on shaft I is a sprocket wheel which receives the chain belt R, which passes over a sprocket pinion S on a shaft T. Said shaft is journaled in a standard U supported on tank wall A and in a fixed girder V, and is rotated by any suitable means, such as the bevel gears W.

The operation of the device is as follows: The shaft I is rotated so as to retract the block K, thus affording space between the blades N, Q, for the cake B to be lowered into pit C, as already described. The shaft I is then rotated in the opposite direction so as to advance the block K, forcing the cutting edge P of blade N against one side of the cake, while the advancing face of block K forces the cake itself against the cutting edge of fixed blade Q. As a consequence, the parts take the position shown in dotted lines, and the portion F of the cake above the plane of the cutting blade, is divided from the portion of the cake in the pit and below said blades.

It is to be noted that the fixed blade Q has its bevel on the lower side and its upper side is consequently flat, while the movable cutting blade N is beveled on the upper side and flat on the lower side. By reason of this construction, the beveled portion of the movable blade has a wedge operation tending to raise the portion F and thus break it away from the lower portion of the cake. On the other hand, the flat top of the fixed blade Q, permits the portion F to slide freely over it, while the beveled under side holds down the bottom part of the cake against the lifting action, already described, of the movable blade N.

I claim:

1. In a device of the kind described, a receptacle for the ice cake constructed to hold said cake in vertical position, a platform above said receptacle, a fixed cutting blade supported on said platform on one side of said receptacle, a movable block supported on said platform on the other side of said receptacle, a cutting blade having its edge disposed in the same horizontal plane as the edge of said fixed blade and mounted on said block, and means for moving said block toward and from said ice cake.

2. In a device of the kind described, a receptacle for the ice cake constructed to hold said cake in vertical position, a platform above said receptacle, a fixed cutting blade supported on said platform on one side of said receptacle, a threaded block supported on said platform on the other side of said receptacle, a cutting blade having its edge disposed in the same horizontal plane as the edge of said fixed blade and mounted on said block, a threaded shaft entering said block, and means for rotating said shaft.

3. In a device of the kind described, means for holding the ice cake in vertical position, a fixed horizontal platform on one side of said holding means, a cutting blade mounted on said platform, a reciprocating pusher block mounted on said platform on the other side of said holding means, and a cutting blade on said block: the aforesaid parts being constructed and arranged, so that upon the advance of said movable blade to meet said cake, said cake shall be forced by said pusher block against said fixed blade, and the portion of said cake above said blades shall be laterally displaced with reference to the portion below said blades.

In testimony whereof I have affixed my signature in presence of two witnesses.

ROBERT H. KIRK.

Witnesses:
GERTRUDE T. PORTER,
MAY T. McGARRY.